United States Patent
Ishihara et al.

(10) Patent No.: US 8,532,848 B2
(45) Date of Patent: Sep. 10, 2013

(54) SYSTEMS AND METHODS FOR ALERTING POTENTIAL TAILSTRIKE DURING LANDING

(75) Inventors: Yasuo Ishihara, Kirkland, WA (US); Steve Johnson, North Bend, WA (US)

(73) Assignee: Honeywell International Inc., Morristown, NJ (US)

( * ) Notice: Subject to any disclaimer, the term of this patent is extended or adjusted under 35 U.S.C. 154(b) by 368 days.

(21) Appl. No.: 12/907,392

(22) Filed: Oct. 19, 2010

(65) Prior Publication Data

US 2012/0095625 A1 Apr. 19, 2012

(51) Int. Cl.
*G05D 1/08* (2006.01)

(52) U.S. Cl.
USPC ............................................. 701/16; 244/183

(58) Field of Classification Search
USPC ............... 701/14–16; 33/328; 244/183, 181, 244/179, 180, 221, 76 R, 75.1, 175, 187, 244/196, 164
See application file for complete search history.

(56) References Cited

U.S. PATENT DOCUMENTS

| | | | |
|---|---|---|---|
| 2,469,571 A | 5/1949 | Phillips | |
| 3,089,457 A | 5/1963 | Millikin | |
| 4,030,065 A | 6/1977 | Bateman | |
| 5,225,829 A | 7/1993 | Bateman | |
| 5,901,927 A * | 5/1999 | Ho | 244/183 |
| 6,422,517 B1 * | 7/2002 | DeWitt et al. | 244/181 |
| 6,761,336 B2 * | 7/2004 | DeWitt et al. | 244/181 |
| 6,879,887 B2 | 4/2005 | Gaidelis, Jr. et al. | |

* cited by examiner

*Primary Examiner* — Dalena Tran
(74) *Attorney, Agent, or Firm* — Ingrassia Fisher & Lorenz, P.C.

(57) ABSTRACT

Systems and methods for alerting for potential tailstrike during landing. A processing device located onboard an aircraft determines whether the aircraft is in a landing operational mode. If the aircraft is determined within the landing operational mode, the processing device determines whether aircraft speed is less than a previously defined threshold speed and generates an alert signal if it is determined that the aircraft's speed is less than the previously defined threshold speed. An output device located onboard the aircraft, outputs an alert based on the generated alert signal.

15 Claims, 3 Drawing Sheets

SYSTEMS AND METHODS FOR ALERTING POTENTIAL TAILSTRIKE DURING LANDING

BACKGROUND OF THE INVENTION

A tailstrike occurs when the tail of an aircraft touches the runway during takeoff or landing. It can occur with any type of aircraft, although tailstrikes occur more often with long aircraft, because tailstrike occurrence is directly related to pitch attitude versus aircraft geometry, and the status of main landing gear extension. About 25% of reported tailstrikes occur at takeoff and 65% at landing.

Tailstrikes at landing generally cause more damage than tailstrikes at takeoff because the tail may strike the runway before the main gear and cause damage to the aft pressure bulkhead. Unstabilized approaches due to deviations from normal approach and landing techniques are the most common causes of tailstrikes.

SUMMARY OF THE INVENTION

The present invention provides systems and methods for alerting potential tailstrike during landing. A processing device located onboard an aircraft determines whether the aircraft is in a landing operational mode. If the aircraft is determined within the landing operational mode, the processing device determines whether aircraft speed is less than a previously defined threshold speed and generates an alert signal if it is determined that the aircraft's speed is less than the previously defined threshold speed. An output device located onboard the aircraft, outputs an alert based on the generated alert signal.

In one aspect of the invention, the predefined threshold speed includes a previously entered reference speed ($V_{REF}$) minus a predefined amount.

In another aspect of the invention, the processing device determines if the aircraft is beyond a predetermined flare position and inhibits generation of the alert signal if the aircraft is determined to be beyond the predetermined flare position.

In still another aspect of the invention, the processing device determines the aircraft is in the landing operational mode if the aircraft is within at least one of a threshold distance or height from a designated runway.

In yet another aspect of the invention, the processing device determines the aircraft is in the landing operational mode if at least one of the flaps or landing gear is at a landing setting.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
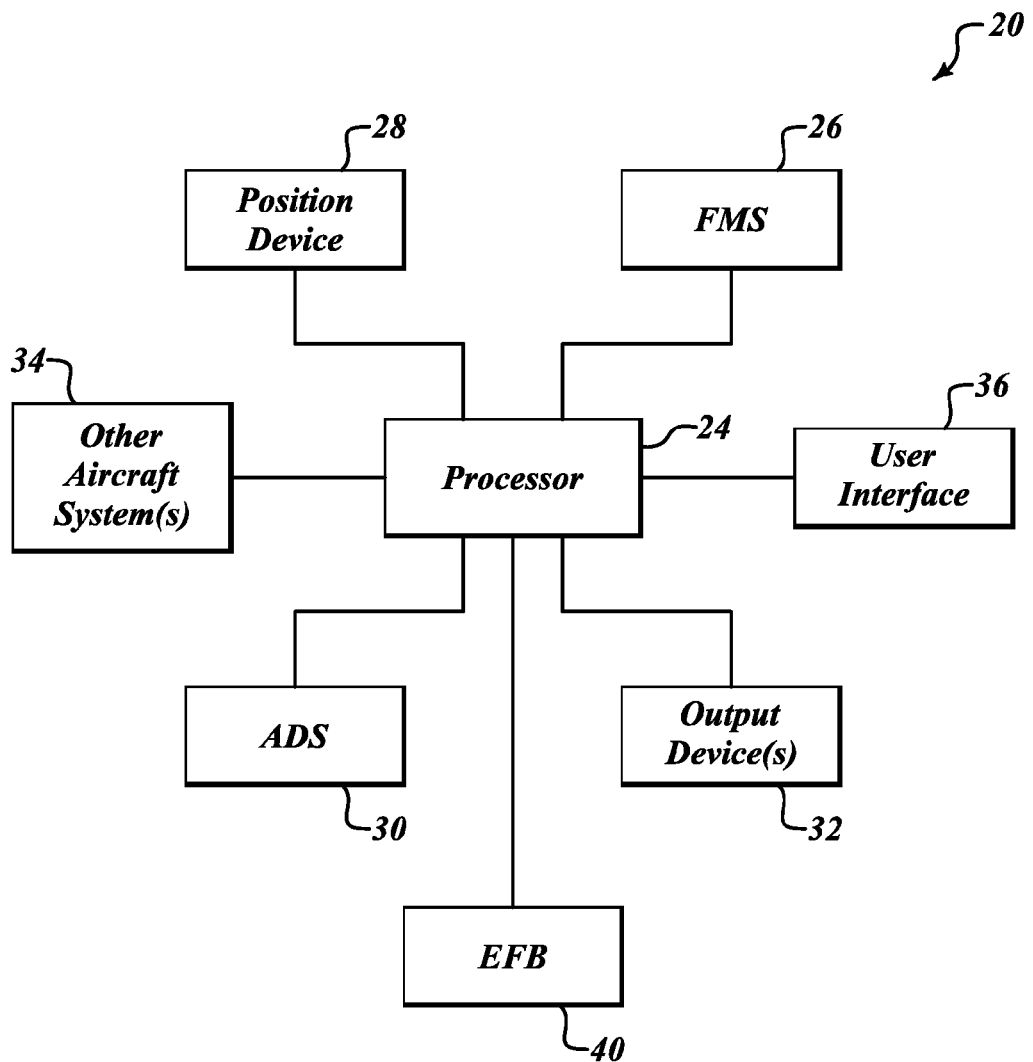
FIG. 1 is a block diagram of an exemplary system located on an aircraft and formed in accordance with an embodiment of the present invention.

FIG. 1 illustrates an exemplary system 20 implemented onboard an aircraft that provides an alert to a pilot upon approach to landing if the present airspeed of the aircraft is below a threshold amount that would indicate that the aircraft is in a nose-up attitude that would likely result in a tailstrike. The system 20 includes a processor 24 that is in signal communication with a Flight Management System (FMS) 26, a position device 28, an Air Data System (ADS) 30, an output device(s) 32, other aircraft system(s) 34 (optional), a user interface 36 and an Electronic Flight Bag (EFB) 40. The processor 24 receives various references, flight and position information from the FMS 26, the position device 28, the ADS 30, the other aircraft system(s) 34, a user interface 36 and/or the EFB 40, then determines whether the aircraft is in a too-slow condition based on the received information. Once the processor 24 determines that the aircraft is in a too-slow condition and is within a threshold envelope of landing on a runway, an alert is generated and outputted to the flight crew via the output device 32 in order to alert the flight crew that a potential tailstrike condition exists.

Figure 2:
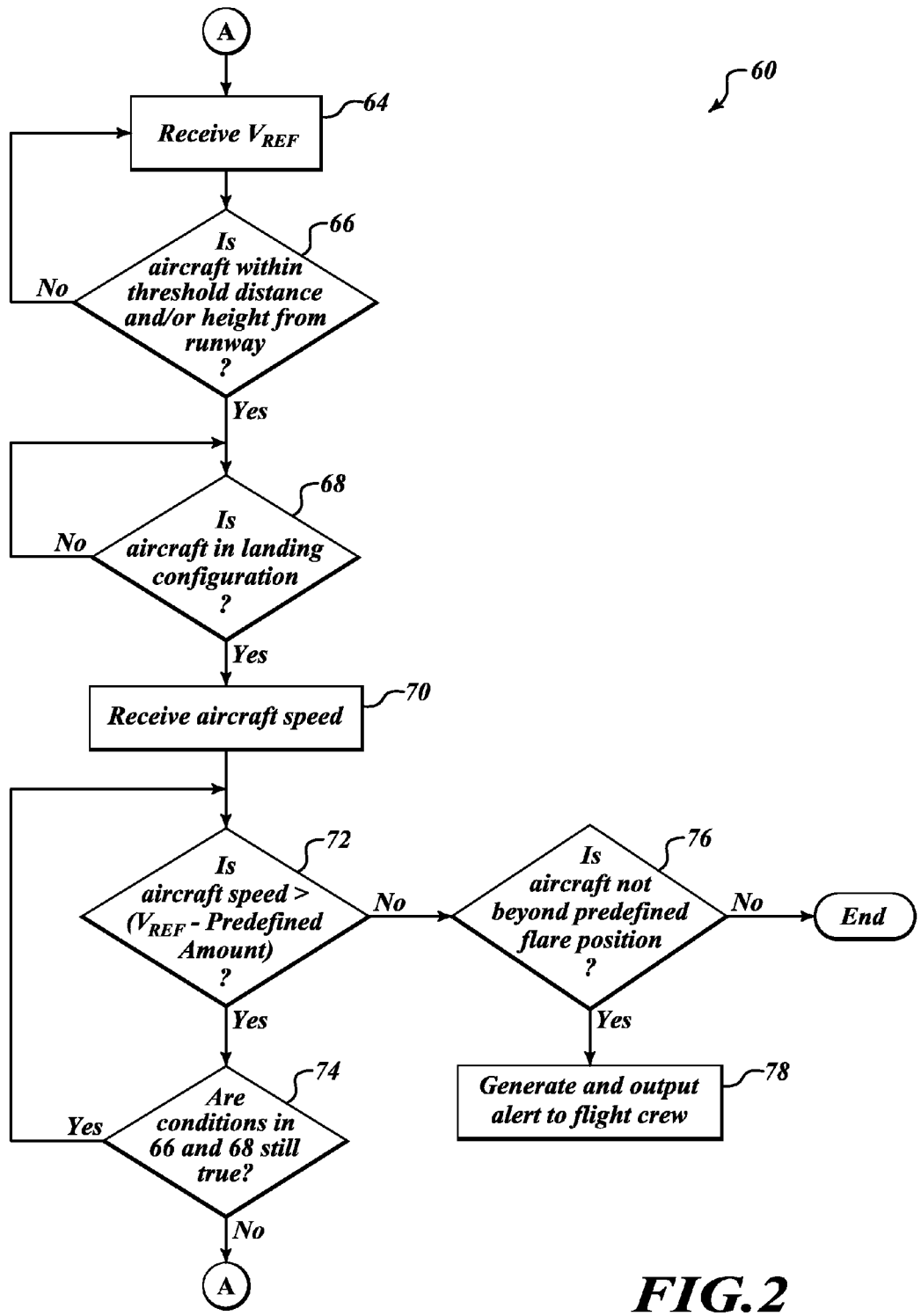
FIG. 2 is a flowchart of an exemplary method performed by the system shown in FIG. 1.

FIG. 2 illustrates an exemplary process 60 performed by the processor 24 of FIG. 1. First, at block 64, the processor 24 receives reference speed ($V_{REF}$) entered by the pilot via the user interface associated with the processor 24, the FMS 26, the ADS 30 and/or the EFB 40. $V_{REF}$ or Landing Reference speed is the nominal speed at which the aircraft is assumed to be flying as it crosses the runway threshold. For older aircraft it is defined as 130% of the FAR-25 stall speed. For newer aircraft it is defined as 123% of the 1-g stall speed. These end up being basically the same value. $V_{REF}$ may be received by the processor 24 any number of different ways, such as automatically from the FMS 26. At a decision block 66, the processor 24 determines whether the aircraft is within a threshold envelope (distance and/or height from an intended runway). If the aircraft is not within the threshold envelope, the process 60 repeats until the condition exists. If the aircraft is determined to be within the threshold envelope, then the processor 24 determines whether the aircraft is in landing configuration, see block 68. The aircraft is determined in landing configuration based on one of a number of factors. For example, the factors may include aircraft airspeed as received from the ADS 30, aircraft position as received from the position device 28 relative to the intended runway, and/or flap or gear or position information or other information that might indicate the aircraft is in a landing configuration as received from other aircraft systems 34 that are in data communication with the processor 24.

If the aircraft is not within landing configuration, the process holds until that condition is true. If the aircraft is determined to be in the landing configuration, the processor 24 receives the aircraft's speed at a block 70 and at a decision block 72 determines whether the received aircraft speed is greater than $V_{REF}$ minus a predefined amount. The predefined amount is one that, when it is subtracted from $V_{REF}$, would put the aircraft at some threshold value which would increase the probability of a tailstrike and which is outside the standard operating procedure. For example, in one embodiment, the predefined amount is set to 5 knots below $V_{REF}$. It can be appreciated that other predefined amounts may be used.

If the processor 24 determines that the aircraft speed is greater than $V_{REF}$ minus the predefined amount, then the process 60 delays at decision block 74, repeats the analysis performed in either one or both of the decision blocks 66 and 68 and returns to the decision block 72 if those conditions still remain true. If the processor 24 determines that the aircraft speed is not greater than $V_{REF}$ minus the predefined amount, then the processor 24, at decision block 76, determines whether the aircraft is beyond a predefined flare position (i.e., a predefined distance from touchdown and in height and distance). If the processor 24 determines that the aircraft is beyond the predefined flare position, then the process 60 ends. If the processor 24 determines that the aircraft is not beyond the predefined flare position, then at a block 78, the processor 24 generates an alert and outputs the generated alert via the output device(s) 32. Examples of audible alerts that are generated and audibly outputted via an audio system associated with the output device(s) 32 include "tail too low", "too slow", or something comparable.

It can be appreciated that other alerts visual, audible or tactile may be provided to the pilot in order to provide an indication of the alert condition identified by the process 60.

In one embodiment, the process 60 is performed by the processor 24 may be implemented in preexisting processing devices aboard the aircraft. For example, an Enhanced Ground Proximity Warning System (EGPWS) may be used as the platform for performing the process 60, because the EGPWS is a platform that is already in data communication with most or all of the components of the system 20 shown in FIG. 1.

Figure 3:
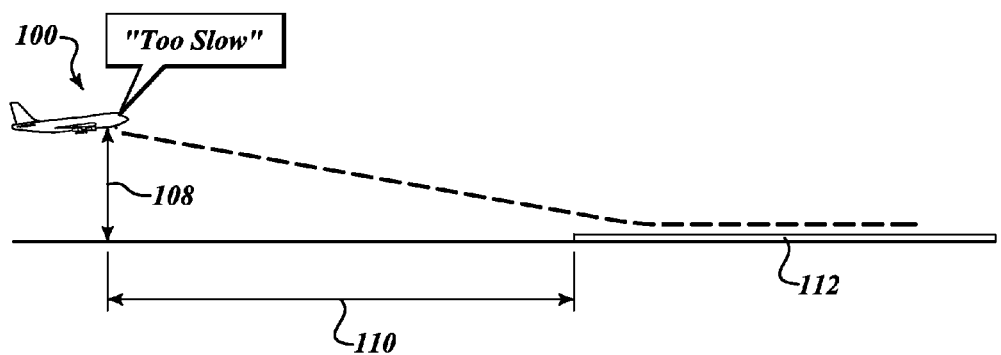
FIG. 3 illustrates a perspective view of an aircraft experiencing a potential tailstrike situation on approach to landing.

FIG. 3 shows a side view of an aircraft 100 on approach to landing on a desired runway 112. The processor 24 located aboard the aircraft 100 determines that the aircraft 100 is within a predefined height limit 108 above the runway 112, within a predefined distance from the end of the runway 110 or a predefined touchdown point on the runway 112 and the aircraft's speed is below a predefined tail too low speed. The processor 24 outputs a "Too Slow" alert if the aircraft hasn't passed a flare position limit, thus giving the flight crew enough time correct (e.g., perform a missed approach).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

The invention claimed is:

1. A method for alerting for potential tailstrike during landing, the method comprising:
   at a processing device located onboard an aircraft,
      determining whether the aircraft is in a landing operational mode;
      if the aircraft is determined within the landing operational mode, determining whether aircraft speed is less than a predefined threshold speed; and
      generating a potential tailstrike alert signal if it is determined that the aircraft's speed is less than the previously defined threshold speed; and
   at an output device located onboard the aircraft, outputting an alert based on the generated alert signal.

2. The method of claim 1, wherein the predefined threshold speed comprises a previously entered reference speed ($V_{REF}$) minus a predefined amount.

3. The method of claim 1, further comprising:
   determining if the aircraft is beyond a predetermined flare position; and
   inhibiting generation of the alert signal if the aircraft is determined to be beyond the predetermined flare position.

4. The method of claim 1, wherein determining the aircraft is in the landing operational mode comprises determining if the aircraft is within at least one of a threshold distance or height from a designated runway.

5. The method of claim 1, wherein determining the aircraft is in the landing operational mode comprises determining if at least one of the flaps or landing gear is at a landing setting.

6. A system located on board an aircraft for alerting for potential tailstrike during landing, the system comprising:
   a plurality of sensors;
   one or more output devices; and
   a processing device being in signal communication with the plurality of sensors and the one or more output devices, the processor device is configured to:
      determine whether the aircraft is in a landing operational mode based on sensor information generated by at least one of the plurality of sensors;
      determine whether aircraft speed as received from at least one of the plurality of sensors is less than a predefined threshold speed, if the aircraft is determined within the landing operational mode; and
      generate a potential tailstrike alert signal if it is determined that the aircraft's speed is less than the previously defined threshold speed,
   wherein an alert is outputted via the one or more output devices based on the generated alert signal.

7. The system of claim 6, wherein the predefined threshold speed comprises a previously entered reference speed ($V_{REF}$) minus a predefined amount.

8. The system of claim 6, wherein the processing device is further configured to:
   determine if the aircraft is beyond a predetermined flare position; and
   inhibit generation of the alert signal if the aircraft is determined to be beyond the predetermined flare position.

9. The system of claim 6, wherein the processing device determines the aircraft is in the landing operational mode by determining if the aircraft is within at least one of a threshold distance or height from a designated runway.

10. The system of claim 6, wherein the processing device determines the aircraft is in the landing operational mode by determining if at least one of flaps or landing gear is in a landing setting.

11. A system located onboard an aircraft for alerting for potential tailstrike during landing, the system comprising:
    a means for determining whether the aircraft is in a landing operational mode;
    a means for determining whether aircraft speed is less than a previously defined threshold speed, if the aircraft is determined within the landing operational mode;
    a means for generating a potential tailstrike alert signal if it is determined that the aircraft's speed is less than the predefined threshold speed; and
    a means for outputting an alert based on the generated alert signal.

12. The system of claim 11, wherein the predefined threshold speed comprises a previously entered reference speed ($V_{REF}$) minus a predefined amount.

13. The system of claim 11, further comprising:
    a means for determining if the aircraft is beyond a predetermined flare position; and
    a means for inhibiting generation of the alert signal if the aircraft is determined to be beyond the predetermined flare position.

14. The system of claim 11, wherein the means for determining the aircraft is in the landing operational mode comprises a means for determining if the aircraft is within at least one of a threshold distance or height from a designated runway.

15. The system of claim 11, wherein the means for determining the aircraft is in the landing operational mode comprises a means for determining if at least one of flaps or landing gear is in a landing setting.

* * * * *